United States Patent [19]
Descamps et al.

[11] 3,917,600
[45] Nov. 4, 1975

[54] 2-(BENZOFURAN)-ACETAMIDINES
[75] Inventors: Marcel Descamps, Crainhem; Alex Areschka, Brussels, both of Belgium
[73] Assignee: Labaz, Paris, France
[22] Filed: Apr. 23, 1973
[21] Appl. No.: 353,482

[30] Foreign Application Priority Data
May 2, 1972  United Kingdom............... 20436/72

[52] U.S. Cl. .................. 260/268 BC; 260/247.5 H; 260/293.58; 260/296 B; 260/326.5 D; 260/346.2 R; 424/250
[51] Int. Cl.² ............... C07D 295/12; C07D 295/18
[58] Field of Search ... 260/268 BC, 268 PH, 556 R, 260/346.2 R, 309.7, 256.4 H, 268 C, 296 B

[56] References Cited
UNITED STATES PATENTS
| | | | |
|---|---|---|---|
| 3,189,614 | 6/1965 | Pesson | 260/566 R |
| 3,282,953 | 11/1966 | Hirt | 260/566 R |
| 3,697,505 | 10/1972 | Gubitz | 260/268 PH |
| 3,700,697 | 10/1972 | Bailey | 260/346.2 R |

OTHER PUBLICATIONS

Wellcome Foundation, Chemical Abstracts, Vol. 65, pp. 2181–2184, (1966).

Primary Examiner—Donald G. Daus
Assistant Examiner—Jose Tovar
Attorney, Agent, or Firm—Mason, Kolehmainen, Rathburn & Wyss

[57] ABSTRACT 2-(2-Alkyl-3-benzofuranyl)-N,N-(3-alkyl-3-azapentamethylene)-acetamidines and related derivatives are useful antihypertensive agents.

8 Claims, No Drawings

2-(BENZOFURAN)-ACETAMIDINES

This invention relates to heterocyclic compounds and is concerned with novel acetamidine derivatives having pharmacological activity and pharmaceutical compositions containing them, and with a process for preparing the said novel acetamidine derivatives.

The acetamidine derivatives with which the invention is concerned can be represented by the general formula:

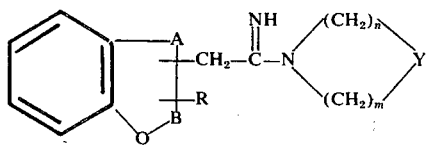   I wherein A-B represents HC—CH or C=C, R represents a hydrogen atom or a straight- or branched-chain lower alkyl group containing from 1 to 4 carbon atoms, Y represents an oxygen atom, a $CH_2$ or $CH\text{-}CH_3$ group, or an NH or substituted NH group such as, for example, a methylamino, ethylamino, n-propylamino, iso-propylamino, n-butylamino, 2-hydroxy-ethylamino, 2-hydroxy-n-propylamino, carbethoxyamino, phenylamino, chlorophenylamino, fluorophenylamino, trifluoromethylphenylamino, benzylamino, 2-pyridylamino or 4-pyridylamino group, $n$ represents an integer of from 1 to 3 and $m$ represents the integer 2 or 3.

The pharmaceutically acceptable single (mono) and double (di) acid addition salts of the acetamidine derivatives represented by formula I are also included within the scope of the present invention.

The compounds of formula I may be prepared by reacting, in an inert organic medium, advantageously an alcoholic medium such as, for example, methanol or ethanol, preferably at room temperature, an iminoester salt represented by the general formula:

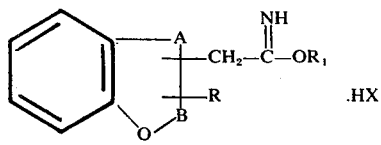   II wherein A-B and R have the same meanings as in formula I, $R_1$ represents a straight-chain lower alkyl radical containing 1 to 4 carbon atoms and X represents the anion of a strong inorganic acid, preferably $Br^-$, $Cl^-$ or $SO_4H^-$, with a secondary cyclic amine represented by the general formula:

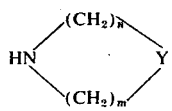   III wherein Y, $n$ and $m$ have the same meanings as in formula I, to form the corresponding salt of the required compound of formula I which can then either be converted to a double salt by reaction with the required quantity of the appropriate acid or be reacted with a base, for example a sodium alcoholate in an anhydrous alcoholic medium, to give the compound of formula I in free base form which, if desired, may then be reacted with a stoichiometric quantity of an organic or inorganic acid to form a different single or double pharmaceutically acceptable acid addition salt.

The compounds of formula II may be prepared by reacting, under substantially anhydrous conditions and in the presence of a strong inorganic acid, a nitrile derivative represented by the general formula:

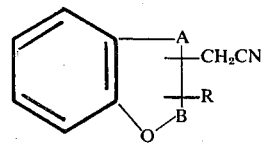   IV wherein A-B and R have the same meanings as in formula I, with a normal alcohol containing from 1 to 4 carbon atoms.

Amongst the compounds of formula IV, that in which A-B represents C=C and R is in the 3-position and represents hydrogen is already known, having been published by R. GAERTNER in J. Am. Chem. Soc., 73, 4400 (1951). The remaining benzofurans of formula IV in which R is in the 3-position and represents a straight- or branched-chain lower alkyl group containing from 1 to 4 carbon atoms may be prepared by cyaniding 2-halogenomethyl-3-R-benzofurans obtained by chloromethylation of 3-R-benzofurans which are already known, having been published by G. ROSSEELS et al. in Ing. Chim. (Brusssels), 53, 37 (1971).

The compounds of formula IV in which A-B represents C=C and R is in the 2-position and represents hydrogen is already known, having been published by G. HALLMANN and K. HAEGELE in Ann., 662, 147 (1963). The compounds of formula IV in which A-B represents C=C and R is in the 2-position and represents a lower alkyl radical containing from 1 to 4 carbon atoms may be prepared by reacting known 2-alkyl-benzofurans with hydrochloric acid in the presence of trioxane as described by GAERTNER in J. Am. Chem. Soc., 74, 5319 (1952). The 2-alkyl-3-chloromethyl-benzofurans thus obtained can then be submitted to the action of potassium cyanide in the presence of potassium iodide, as is also described in the same J. Am. Chem. Soc. reference.

The compounds of formula IV in which A-B represents HC-CH may be obtained from the corresponding 2 or 3-carboxamidomethyl-2,3-dihydro-benzofurans by dehydration of the latter which themselves may be synthesized, for example, by reacting ammonia with the corresponding 2,3-dihydro-benzofuranyl-acetic acids or with a derivative thereof such as an ester or the chloride.

When R is in the 2-position and represents either hydrogen or an alkyl radical containing from 1 to 4 carbon atoms, the required 3-(2-R-2,3-dihydro-benzofuranyl)-acetic acids may be obtained by hydrogenation of the corresponding benzofuranyl acetic acids which themselves may be synthesized by hydrolysis from the appropriate ethyl-2-R-(3-benzofuranyl)-iminoester salt of formula II and which is obtained by the process hereinbefore described in connection with the compounds of formula II.

When R is in the 3-position and represents hydrogen, 2-(2,3-dihydro-benzofuranyl)-acetic acid is used as starting-product. This acid is already known, having been described by D. MISITI et al. in Gazz. Chim. Ital. 93, 52 (1963). This acid is first converted to its chloride by the action of, for example, thionyl chloride and the resulting chloride reacted with ammonia to give the acetamide. This latter compound is dehydrated by means of phosphorus pentoxide to form the required 2-acetonitrile of formula IV.

The compounds of the invention have been found to possess valuable pharmacological properties in that some of them exert a marked antihypertensive effect coupled with a very useful diuretic action, whilst others have been observed to possess either an antihypertensive or a diuretic action, which would suggest that there is not necessarily any relationship between the two properties when present in one and the same molecule.

The antihypertensive properties of the compounds of the invention are likely to render them valuable in the clinical treatment of disorders of the cardiovascular system characterized by high blood pressure, while the diuretic effect is likely to be useful in combating conditions of oedema in general and congestive cardiac insufficiency in particular.

Many of the antihypertensive agents known up to present exert a ganglioplegic effect in that they interrupt the sympathicotonic impulses thus causing relaxation of the vascular walls. This phenomenon may be dangerous in cases when the patient requires increased tonicity of the vascular walls as a result of, for example, a change of position. Other known agents exert such a sudden and powerful antihypertensive effect that their action is difficult to control. The compounds of the invention do not present these disadvantages. It has, in fact, been observed that the antihypertensive action of the compounds of the invention, while being very appreciable, is easy to control. This advantage is due to the fact that the antihypertensive effect of compounds of the invention is moderate at first and gradually increases in intensity according to the doses administered, thus eliminating the danger of a sudden fall of arterial pressure which may occur when agents are used which exert too rapid an antihypertensive effect. Furthermore, the antihypertensive action of compounds of the invention is exerted with little or no undesirable side-effects and an extremely low degree of toxicity while no signs of loss of activity due to habituation have so far been observed.

The diuretic action is characterized by a very favourable sodium-excretion index. It is, in fact, suspected that retention of sodium in the arterial wall plays an important part in hypertension so that compounds of the invention may be reasonably expected to constitute valuable adjuncts in the treatment of such states, independently of their action on oedema.

Finally, it should be noted that the compounds of the invention are likely to provide valuable replacement medication. It frequently occurs, in fact, that when the same therapeutic agent is administered to the same patient over a lengthy period of time the doctor prefers, for psychological or other reasons, to change the agent and use another medicament having the same therapeutic indications. It also happens that a particular therapeutic agent is only effective in a certain number of cases and, for quite inexplicable reasons, is only slightly effective or completely inactive in other cases presenting identical symptoms. This means that there is a continual need for new drugs which may be employed either in place of drugs which have been used to treat the same patient over a certain period of time or which offer the possibility of treating cases in which existing medication has failed to produce the desired effect. The compounds of the invention may be expected, as stated above, to constitute under these circumstances extremely valuable replacement agents.

Pharmacological tests have been undertaken with a view to demonstrating the antihypertensive and diuretic properties, both separately and together, of compounds of the invention.

In all these trials the following scale of values has been adopted to express reduction of arterial pressure in chronically hypertensive rats and increase in urinary excretion:

| Value | Reduction of Arterial Pressure | Increase in Urinary Excretion |
|---|---|---|
| 1 corresponds to | 5 to 10 mm. Hg | 40% to 60% |
| 2 corresponds to | 10 to 20 mm. Hg | 60% to 80% |
| 3 corresponds to | 20 to 30 mm. Hg | 80% to 100% |
| 4 corresponds to | 30 to 40 mm. Hg | 100% to 160% |

The first pharmacological test, which, for purposes of facility is referred to herein as Test A, was undertaken with a view to evaluating the antihypertensive activity of compounds of the invention which had been found to be devoid of diuretic properties at the doses employed.

This test was carried out on male rats weighing between 140 and 170 g. in which chronic renal hypertension had been induced by the Grollman technique [Proc. Soc. exp. Biol. Med., 57, 102 (1944)]. According to this technique, the animals are anaesthetized with ether and one kidney is displaced from its site without being detached from the body, the suprarenal gland having been first liberated from the kidney but otherwise left intact. The kidney is then bound with twine in the form of a figure eight, just tightly enough to alter slightly the ellipsiod shape of the organ. Ten days later, the other kidney is completely removed together with its suprarenal gland. About four weeks after the second operation, most of the animals develop severe hypertension, systolic pressure in the majority of cases exceeding 180 mm. Hg.

Groups of rats so treated received compounds of the invention in a dose of 100 mg./kg by intragastric route. Arterial pressure was measured immediately and 1, 2, 3, 4, 5 and 6 hours after administration.

The following two compounds gave the results indicated:

| Compound | Value |
|---|---|
| 2-(2-methyl-3-benzofuranyl)-N,N-tetramethylene-acetamidine HCl | 2 |
| 2-(3-ethyl-2-benzofuranyl)-N,N-(3-aza-pentamethylene)-acetamidine HCl | 2 |

In the same test, performed with a well-known antihypertensive agent, namely α-methyl-(3,5-dihydroxyphenyl)-alanine, it was found that an intragastric dose of 400 mg./kg of the latter was required to obtain an activity value of 3. Another agent recognized as possessing antihypertensive properties, namely hydrochlorothiazide proved to be inactive in this test at a dose of 200 mg./kg. given by intragastric route.

The second pharmacological test, herein referred to as Test B, was performed in order to determine the diuretic properties of compounds of the invention which had been found to be devoid of antihypertensive activity at the doses employed.

This test was carried out on rats weighing 150 to 200 g. which were divided into groups of 20. Several days before the test, each rat received 50 ml./kg. of a 0.9% solution of sodium chloride by intragastric route. The urinary excretion was measured and noted for each animal as its own control figure. When the test was performed, each animal again received 50 ml./kg. of a 0.9% solution of sodium chloride by intragastric route, followed by 50 mg./kg. of the compound to be tested also by intragastric route. Urinary excretion was measured and compared with the control figures already noted.

The following results were obtained with the compounds indicated which were all used in the form of a pharmaceutically acceptable acid addition salt such as, for example, the hydrochloride or dihydrochloride:

| Compound | Value |
|---|---|
| 2-(2-methyl-3-benzofuranyl)-N,N-pentamethylene-acetamidine | 2 |
| 2-(2-methyl-3-benzofuranyl)-N,N-(3-methyl-3-aza-pentamethylene)-acetamidine | 2 |
| 2-(2-ethyl-3-benzofuranyl)-N,N-(3-aza-pentamethylene)-acetamidine | 3 |
| 2-(2-ethyl-3-benzofuranyl)-N,N-(3-ethyl-3-aza-pentamethylene)-acetamidine | 4 |
| 2-(2-ethyl-3-benzofuranyl)-N,N-(3-benzyl-3-aza-pentamethylene)-acetamidine | 2 |
| 2-(2-ethyl-3-benzofuranyl)-N,N-(3-carbethoxy-3-aza-pentamethylene)-acetamidine | 4 |
| 2-(2-n-propyl-3-benzofuranyl)-N,N-(3-methyl-3-aza-pentamethylene)-acetamidine | 2 |
| 2-(2-n-propyl-3-benzofuranyl)-N,N-pentamethylene-acetamidine | 2 |

The average value of urinary excretion obtained with these same rats as control figure was less than 1, the percentage being between 20% and 40%.

The same test was performed for comparison purposes with a well-known diuretic, namely hydrochlorothiazide which proved to have an activity value of 2 at a dose of 100 mg./kg. given by intragastric route.

The same pharmacological Tests A and B were performed with other compounds of the invention for the purpose of showing that they possess both antihypertensive and diuretic properties.

The compounds employed in this double test were all used in the form of a pharmaceutically acceptable acid addition salt such as, for example, the hydrochloride or dihydrochloride.

The following results were obtained with the compounds indicated:

| Compound | Test A | Test B |
|---|---|---|
| 2-(2-ethyl-3-benzofuranyl)-N,N-tetramethylene-acetamidine | 1 | 2 |
| 2-(2-ethyl-3-benzofuranyl)-N,N-(3-methyl-3-aza-pentamethylene)-acetamidine | 3 | 4 |
| 2-(2-ethyl-3-benzofuranyl)-N,N-(3-n-propyl-3-aza-pentamethylene)-acetamidine | 3 | 2 |
| 2-(2-ethyl-3-benzofuranyl)-N,N-(3-isopropyl-3-aza-pentamethylene)-acetamidine | 2 | 4 |
| 2-(2-ethyl-3-benzofuranyl)-N,N-(3-n-butyl-3-aza-pentamethylene)-acetamidine | 2 | 1 |
| 2-(2-ethyl-3-benzofuranyl)-N,N-[3-(2-hydroxy-1-propyl)-3-aza-pentamethylene]-acetamidine | 1 | 3 |
| 2-(2-isopropyl-3-benzofuranyl)-N,N-pentamethylene acetamidine | 2 | 2 |
| 2-(2-isopropyl-3-benzofuranyl)-N,N-(3-methyl-3-aza-pentamethylene)-acetamidine | 1 | 1 |
| 2-(3-ethyl-2-benzofuranyl)-N,N-(3-methyl-3-aza-pentamethylene)-acetamidine | 1 | 1 |

Four additional pharmacological tests (Tests C, D, E and F) were performed in order to determine the antihypertensive activity of one of the preferred compounds of the invention, namely:

2-(2-ethyl-3-benzofuranyl)-N,N-(3-n-propyl-3-azapentamethylene)-acetamidine dihydrochloride (hereinafter referred to as Compound X).

In each of these tests a state of marked hypertension was provoked in rats.

In Test C, hypertension was produced by ablation of one kidney and the corresponding adrenal gland after which desoxycorticosterone acetate was administered subcutaneously every day over a period of four weeks. Throughout this period the drinking-water for the rats contained 1% NaCl. Under these circumstances, arterial pressure rose to 200 mm. Hg.

In Test D, the food given to young rats during the six weeks after weaning contained 6% NaCl which resulted in a systolic pressure of 180 mm. Hg.

In Test E, young rats, as soon as they were weaned, underwent unilateral nephrectomy after which they received the normal diet containing, in addition, 6% NaCl. At the end of 5 or 6 weeks, arterial pressure reached and even exceeded 180 mm Hg.

In Test F, hypertension was produced in male rats weighing from 200 to 250 g. by sino-carotid and aortic denervation in accordance with the technique described by E. M. KRIEGER in Circulation Research, Vol. XV, Dec. 1964.

The results obtained in these four tests with Compound X were as follows:

Test C

A dose of 100 mg./kg. by intragastric route caused a drop in pressure of 26 mm. Hg Test D A dose of 100 mg./kg. by intragastric route caused a drop in pressure of 24 mm. Hg Test E A dose of 100 mg./kg. by intragastric route caused a drop in pressure of 24 mm. Hg Test F A dose of 200 mg./kg. by intragastric route caused a drop in pressure of 28 mm. Hg.

Chronic trials were carried out with Compound X over a period of 11 days on five groups of rats whose blood pressure had been chronically increased by one of the techniques used in Test, A, C, D, E and F. Each group was treated by a different technique so that all five techniques were represented. Each group comprised 10 rats and for each type of test there was a control group of 10 untreated animals. All the rats in the test groups received an intragastric dose of Compound X at the beginning of each of the 11 days, just after its blood pressure had been measured. In every test group it was found that Compound X produced a constant reduction of blood pressure equivalent to the value 3 at a regular daily dose of 50 mg./kg. in the rats treated in accordance with the technique of Test C, 100 mg./kg. in the rats treated in accordance with the techniques of Tests A, D and E and 200 mg./kg. in the rats treated in accordance with the technique of Test F.

A pharmacological test was also carried out on the anaesthetized cat with a view to showing that Compound X is devoid of ganglioplegic activity. The tonus of the nictitating membrane was first noted after which the contractile reaction of the membrane to electric stimulation of the preganglionic fibre of the cervical sympathetic nerve was tested. It was found that intravenous doses of Compound X up to 4 mg./kg. did not modify the intensity of the contractions of the membrane provoked by the electric stimulation. This proves that Compound X is devoid of gangliopegic effects.

Finally, a pharmacological test was performed to ascertain the $Na^+$ and $K^+$ ion excretion values of another preferred compound of the invention, namely: 2-(2-ethyl-3-benzofuranyl)-N,N-(3-ethyl-3-aza-pentamethylene)-acetamidine in the form of its dihydrochloride.

This preferred compound is referred to hereinafter as Compound Y and has already been presented above as possessing marked diuretic properties. The ideal diuretic ensures increased excretion of sodium ions while maintaining at a reasonably normal level the excretion of potassium ions.

In this test the $Na^+$ and $K^+$ ion excretion values of Compound Y were compared with those of hydrochlorothiazide.

The test was performed on rats which had been fasting for 18 hours. The substance to be tested was given by intragastric route immediately after an intragastric injection of 50 ml./kg. of distilled water. A control group only received the distilled water. The total amount of urine excreted during the 4 hours following administration was collected and measured and the total $Na^+$ and $K^+$ ion excretion values determined. These values were then converted to milliequivalents per liter (mEq/l.) in order to obtain the correct $Na^+$ and $K^+$ ion excretion figures independently of the increase in the amount of urine.

It was found that with Compound Y at a dose of 20 mg./kg. the excretion of $Na^+$ ions expressed in mEq/l. was more than quadrupled while that of $K^+$ ions, also expressed in mEq/l. was increased by less than 50%. The same dose of hydrochlorothiazide only tripled $Na^+$ ion excretion while doubling that of $K^+$ ions.

Toxicity tests were carried out with the following compounds of the invention on rats by intragastric route and gave the results indicated:
2-(2-ethyl-3-benzofuranyl)-N,N-(3-n-propyl-3-aza-pentamethylene)-acetamidine dihydrochloride (Compound X) - $LD_{50}$: 700 mg./kg.
2-(2-ethyl-3-benzofuranyl)-N,N-(3-ethyl-3-aza-pentamethylene)-acetamidine dihydrochloride (Compound Y) - $LD_{50}$: 750 mg./kg.
2-(2-ethyl-3-benzofuranyl)-N,N-(3-methyl-3-aza-pentamethylene)-acetamidine hydrochloride (herein referred to as Compound Z)-$LD_{50}$: 750 mg./kg.

Since the active doses for Compounds X, Y and Z have been found under the same conditions (rat by intragastric route) to be 100 mg./kg., 50 mg./kg. and 100 mg./kg. respectively, it is seen that the toxic doses are far in excess of the amounts required to produce a pharmacological effect and that the compounds cited present a wide margin of security.

It will be appreciated that for therapeutic use the compounds of the invention will normally be administered in the form of a pharmaceutical composition, which may be in a dosage unit form appropriate to the desired mode of administration. Thus the pharmaceutical composition may take the form of, for example, a coated or uncoated tablet, a hard or soft-geltain capsule or an oily suspension for oral administration, a suppository for rectal administration or a non-aqueous solution for administration by injection.

Irrespective of the form which the composition takes, the pharmaceutical composition will normally comprise at least one of the compounds of formula I or a pharmaceutically acceptable acid addition salt thereof in association with pharmaceutical excipient therefor. Examples of excipients which may be used are milk sugar, starches, talc, magnesium stearate, polyvinylpyrrolidone, alginic acid and colloidal silica. The composition may also contain a varnishing agent such as cellulose acetophthalate and/or a plasticizer such as diethylphthalate, and if desired a flavouring agent.

The following Examples illustrate the preparation of compounds of the invention and of pharmaceutical compositions containing compounds of the invention.

EXAMPLE 1

2-(2-Ethyl-3-benzofuranyl)-N,N-(3-n-propyl-3-azapentamethylene)-acetamidine a. 2-Ethyl-3-chloromethyl-benzofuran In a three-litre, three-necked flask, equipped with a stirrer, an immersion thermometer and a dropping funnel, 100 g. of trioxane (1.1 mol) and 1.5 litres of concentrated hydrochloric acid were placed. After vigorous stirring to emulsify the reaction mixture, 292 g. (2 mols) of 2-ethyl-benzofuran were added drop-by-drop, while the temperature was maintained between 25° and 30°C. The operation lasted about 45 minutes after which vigorous stirring was continued for 3.5 hours. The contents of the flask were transferred to a three-litre decanter, the organic layer was separated out and the aqueous layer extracted twice with a total of 600 ml. of petroleum ether (b.p. 30°–60°C). The organic fractions were placed together, washed two or three times with water and then with an aqueous solution of sodium bicarbonate until the solution became neutral. The solution was then dried over anhydrous sodium sulphate, filtered, the solvent eliminated under reduced pressure and finally the residual 2-ethyl-benzofuran removed under high vacuum. The crude residue of 2-ethyl-3-chloromethyl-benzofuran obtained weighed 345 g., corresponding to a yield of 88.6% of the theoretical yield. It boiled at 92°–99°C. at 0.4 mm.Hg with slight decomposition.

In a similar manner, the following compounds were prepared:

| | | |
|---|---|---|
| 2-n-propyl-3-chloromethyl-benzofuran | b.p. | 90–98°C. 0.15 mm.Hg |
| 2-isopropyl-3-chloromethyl-benzofuran | b.p. | 97–102°C. 0.5 mm.Hg |
| 2-n-butyl-3-chloromethyl-benzofuran | b.p. | 104–124°C. 0.25 mm.Hg | b. 2-Ethyl-3-cyanomethyl-benzofuran

In a three-necked, three-litre flask equipped with a stirrer, a dropping funnel and an immersion thermometer, 115 g. (1.77 mol) of potassium cyanide powder were placed with 8 g. of potassium iodide and 300 ml. of dimethylformamide. To this suspension, 344.2 g. (1.77 mol) of 2-ethyl-3-chloromethyl-benzofuran in the crude state were added, while stirring, at a rate such that the temperature of the reaction medium was maintained at 50°C. Stirring was continued for 18 hours at 20°C. after which 1.5 litres of ice-water were added. The organic phase was separated out and the aqueous phase extracted three times with 250 ml. of benzene. The organic phases were washed with water and dried over anhydrous sodium sulphate. After filtering the solvent was eliminated under reduced pressure and the residue purified by fractional distillation. 201.9 g. of 2-ethyl-3-cyanomethyl-benzofuran were obtained, boiling at 108°–110°C. under 0.1 mm.Hg. Yield 61.6%. The product solidified and melted at about 30°C.

In a similar manner, the following compounds were obtained:

| | | |
|---|---|---|
| 2-n-propyl-3-cyanomethyl-benzofuran | b.p. | 123–130°C. 0.2 mm.Hg |
| 2-isopropyl-3-cyanomethyl-benzofuran | b.p. | 104–107°C. 0.2 mm.Hg |
| 2-n-butyl-3-cyanomethyl-benzofuran | b.p. | 135–148°C. 0.5 mm.Hg | c. Ethyl (2-ethyl-3-benzofuranyl)-iminoacetate hydrochloride

In a two-litre, three-necked flask equipped with a stirrer, an immersion thermometer, a gas-bubbling tube, 203.5 g. (1.1 mol) of 2-ethyl-3-cyanomethyl-benzofuran were placed with 102 ml. of absolute ethanol and 420 ml. of anhydrous ether. The solution was cooled to −15°C. and, while stirring, dry hydrochloric acid gas was bubbled through for 6 hours. Throughout this operation, the temperature was maintained at −5°C. A further 420 ml. of ether were added and the solution was allowed to stand for 12 hours at 20°C. The ethyl (2-ethyl-3-benzofuranyl)-iminoacetate hydrochloride which precipitated was filtered out, washed with ether and dried. In this way, 279.5 g. were obtained, melting at about 140°C. (decomposition). Yield: 95%.

By the same procedure, the following compounds were prepared from the corresponding 2-alkyl-3-cyanomethyl-benzofurans:

| | | |
|---|---|---|
| ethyl (2-methyl-3-benzofuranyl)-iminoacetate hydrochloride | m.p. | 118°C. |
| ethyl (2-n-propyl-3-benzofuranyl)-iminoacetate hydrochloride | m.p. | 140°C. |
| ethyl (2-isopropyl-3-benzofuranyl)-iminoacetate hydrochloride | m.p. | 175–176°C. |
| ethyl (2-n-butyl-3-benzofuranyl)-iminoacetate hydrochloride | m.p. | 122–124°C. | d. 2-(2-Ethyl-3-benzofuranyl)-N,N-(3-n-propyl-3-aza-pentamethylene)-acetamidine

To a solution of 55 g. (0.43 mol) of 1-n-propylpiperazine in 370 ml. of methanol, were added 114.5 g. (0.428 mol) of ethyl (2-ethyl-3-benzofuranyl)-iminoacetate hydrochloride. The reaction medium was then allowed to stand for 48 hours at 20°–24°C. The solvent was evaporated under reduced pressure and the residue was taken up in 55 ml. of isopropanol.

The solution was then diluted with 550 ml. of dry ethyl ether, allowed to stand for 12 hours at room temperature, then for 2 hours in a refrigerator at about 5°C.

The precipitate which formed was filtered out and washed with ethyl ether.

By this method, 117.5 g. of 2-(2-ethyl-3-benzofuranyl)-N,N-(3-N-propyl-3-aza-pentamethylene)-acetamidine hydrochloride were obtained which represents a yield of 78.5% of the theoretical value. m.p. 151°–152°C.

While stirring a solution of 9.66 g. (0.025 mol) of 2-(2-ethyl-3-benzofuranyl)-N,N-(3-n-propyl-3-aza-pentamethylene)-acetamidine hydrochloride in a mixture of 100 ml. of absolute ethanol and 100 ml. of methanol was added to sodium ethylate prepared from 0.69 g. (0.03 at. g.) of sodium in 100 ml. of dry ethanol. After the inorganic precipitate was filtered out, the solvent was evaporated under reduced pressure and the residue was taken up in 200 ml. of dry ethyl ether. The solution so obtained was treated with animal charcoal and the solvent was evaporated under reduced pressure. After drying under high vacuum 7.8 g. of an oily residue constituted by 2-(2-ethyl-3-benzofuranyl)-N,N-(3-n-propyl-3-aza-pentamethylene)-acetamidine were obtained which represents a yield of 100 % of the theoretical value.

The 2-(2-ethyl-3-benzofuranyl)-N,N-(3-n-propyl-3-aza-pentamethylene)-acetamidine hydrochloride previously obtained was converted to the dihydrochloride salt as hereinafter described.

DIHYDROCHLORIDE 110 g. of 2-(2-ethyl-3-benzofuranyl)-N,N-(3-n-propyl-3-aza-pentamethylene)-acetamidine hydrochloride were dissolved in 250 ml. of dry ethanol. While stirring and cooling, the solution was acidified by means of dry hydrochloric acid dissolved in ethyl ether. The reaction medium was allowed to stand for 1 hour at room temperature, then for 1 hour at 5°C. The precipitate so formed was filtered out, washed with absolute ethanol and with ether. In this way, 106 g. of 2-(2-ethyl-3-benzofuranyl)-N,N-(3-n-propyl-3-aza-pentamethylene)-acetamidine dihydrochloride, m.p. 273°–275°C., were obtained which represents a yield of 87% of the theoretical value.

From the free base previously obtained, the dihydrobromide, disulphate and acid oxalate salts were prepared as follows:

DIHYDROBROMIDE

A solution of 1.57 g. (0.005 mol) of 2-(2-ethyl-3-benzofuranyl)-N,N-(3-n-propyl-3-aza-pentamethylene)-acetamidine in 15 ml. of isopropanol was acidified by means of a hydrobromic ethereal solution. The reaction medium was diluted with dry ether and the crystals were filtered out and recrystallized from a methanol/ethanol mixture. By this means 2-(2-ethyl-3-benzofuranyl)-N,N-(3-n-propyl-3-aza-pentamethylene)-acetamidine dihydrobromide, m.p. 287°–289°C., was obtained.

DISULPHATE

A solution of 1.57 g. (0.005 mol) of 2-(2-ethyl-3-benzofuranyl)-N,N-(3-n-propyl-3-aza-pentamethylene)-acetamidine in 20 ml. of ethyl ether was acidified by means of concentrated sulphuric acid (95%, $d$=1.83).

The precipitate which formed was filtered out and recrystallized from methanol. In this manner 2-(2-ethyl-3-benzofuranyl)-N,N-(3-n-propyl-3-aza-pentamethylene)-acetamidine disulphate, m.p. 222°–225°C., was obtained.

ACID DIOXALATE

A solution of 1.57 g. (0.005 mol) of 2-(2-ethyl-3-benzofuranyl)-N,N-(3-n-propyl-3-aza-pentamethylene)-acetamidine in 15 ml. of isopropanol was acidified by means of a solution of 1.35 g. (0.015 mol) of oxalic acid in ethyl ether. The precipitate which formed was filtered out and recrystallized from methanol containing traces of oxalic acid. In this manner, 2-(2-ethyl-3-benzofuranyl)-N,N-(3-n-propyl-3-aza-pentamethylene)-acetamidine acid dioxalate, m.p. 216°–218°C., was obtained.

By following the same procedure as that described above but using the appropriate starting-products, the compounds listed hereunder were prepared:

EXAMPLE 2

2-(2-Ethyl-3-benzofuranyl)-N,N-(3-aza-pentamethylene)-acetamidine dihydrochloride To a suspension of 8 g. (0.03 mol) of ethyl (2-ethyl-3-benzofuranyl)-iminoacetate hydrochloride, prepared

| Compounds | | Melting Point (°C.) |
|---|---|---|
| 2-(2-ethyl-3-benzofuranyl)-N,N-(3-ethyl-3-aza-pentamethylene)-acetamidine | | 75–78 |
| | hydrochloride | 202–204 |
| | dihydrochloride | 254–257 |
| | dihydrobromide | 297–299 |
| | disulphate | 191–194 |
| | acid dioxalate | 222–224 (decomposition) |
| 2-(2-ethyl-3-benzofuranyl)-N,N-(3-isopropyl-3-aza-pentamethylene)-acetamidine hydrochloride | | 204–207 |
| 2-(2-ethyl-3-benzofuranyl)-N,N-(3-n-butyl-3-aza-pentamethylene)-acetamidine hydrochloride | | 167–170 |
| 2-(2-ethyl-3-benzofuranyl)-N,N-(3-methyl-3-aza-pentamethylene)-acetamidine hydrochloride | | 179–180 |
| 2-(2-ethyl-3-benzofuranyl)-N,N-[3-(2-hydroxy-1-ethyl)-3-aza-pentamethylene]-acetamidine hydrochloride | | 168–170 |
| 2-(2-ethyl-3-benzofuranyl)-N,N-[3-(2-hydroxy-1-propyl)-3-aza-pentamethylene]-acetamidine hydrochloride | | 206–210 |
| 2-(2-ethyl-3-benzofuranyl)-N,N-(3-phenyl-3-aza-pentamethylene)-acetamidine hydrochloride | | 226–229 |
| 2-(2-ethyl-3-benzofuranyl)-N,N-(3-benzyl-3-aza-pentamethylene)-acetamidine hydrochloride | | 197–200 |
| 2-(2-ethyl-3-benzofuranyl)-N,N-[3-(2-pyridyl)-3-aza-pentamethylene]-acetamidine hydrochloride | | 237–240 (decomposition) |
| 2-(2-ethyl-3-benzofuranyl)-N,N-(3-carbethoxy-3-aza-pentamethylene)-acetamidine hydrochloride | | 267 (decomposition) |
| 2-(2-ethyl-3-benzofuranyl)-N,N-(3-methyl-3-aza-hexamethylene)-acetamidine hydrochloride | | 209–213 |
| 2-(2-ethyl-3-benzofuranyl)-N,N-(3-ethyl-3-aza-hexamethylene)-acetamidine dihydrochloride | | 175–179 |
| 2-(2-ethyl-3-benzofuranyl)-N,N-(3-n-propyl-3-aza-hexamethylene)-acetamidine hydrochloride | | 167–170 |
| | dihydrochloride | 279–282 |
| 2-(2-methyl-3-benzofuranyl)-N,N-(3-methyl-3-aza-pentamethylene)-acetamidine hydrochloride | | 220–221 |
| 2-(2-n-propyl-3-benzofuranyl)-N,N-(3-methyl-3-aza-pentamethylene)-acetamidine dihydrochloride | | 238–241 |
| 2-(2-isopropyl-3-benzofuranyl)-N,N-(3-methyl-3-aza-pentamethylene)-acetamidine hydrochloride | | 196–198 |
| 2-(2-n-butyl-3-benzofuranyl)-N,N-(3-methyl-3-aza-pentamethylene)-acetamidine hydrochloride | | 171–173 |
| 2-(2-methyl-3-benzofuranyl)-N,N-tetramethylene-acetamidine hydrochloride | | 259–260 |
| 2-(2-methyl-3-benzofuranyl)-N,N-pentamethylene-acetamidine hydrochloride | | 258–259 |
| 2-(2-methyl-3-benzofuranyl)-N,N-(3-oxa-pentamethylene)-acetamidine hydrochloride | | 226–228 |
| 2-(2-ethyl-3-benzofuranyl)-N,N-tetramethylene-acetamidine hydrochloride | | 256–258 |
| 2-(2-ethyl-3-benzofuranyl)-N,N-pentamethylene-acetamidine hydrochloride | | 246–247 |
| 2-(2-ethyl-3-benzofuranyl)-N,N-(3-methyl-pentamethylene)-acetamidine hydrochloride | | 196–198 |
| 2-(2-ethyl-3-benzofuranyl)-N,N-(3-oxa-pentamethylene)-acetamidine hydrochloride | | 244–246 |
| 2-(2-n-propyl-3-benzofuranyl)-N,N-pentamethylene-acetamidine hydrochloride | | 221–224 |
| 2-(2-isopropyl-3-benzofuranyl)-N,N-pentamethylene-acetamidine hydrochloride | | 224–225 |
| 2-(2-ethyl-3-benzofuranyl)-N,N-[3-(4-pyridyl)-3-aza-pentamethylene]-acetamidine dihydrochloride | | >300 |
| 2-(2-ethyl-3-benzofuranyl)-N,N-[3-(4-chlorophenyl)-3-aza-pentamethylene]-acetamidine hydrochloride | | 234–236 |
| 2-(2-ethyl-3-benzofuranyl)-N,N-[3-(4-fluorophenyl)-3-aza-pentamethylene]-acetamidine hydrochloride | | 210–212 |
| 2-(2-isopropyl-3-benzofuranyl)-N,N-(3-ethyl-3-aza-pentamethylene)-acetamidine hydrochloride | | 180–184 |
| 2-(2-ethyl-3-benzofuranyl)-N,N-heptamethylene-acetamidine hydrochloride | | 249–253 |
| 2-(2-ethyl-3-benzofuranyl)-N,N-[3-(3-trifluoromethylphenyl)-3-aza-pentamethylene]-acetamidine hydrochloride | | 200–203 | as described in Example 1, were added 3.1 g. of triethylamine and 2.65 g. of 97% piperazine (0.03 mol). The mixture was allowed to stand for 24 hours at a temperature of 20°–24°C. The solvent was then evaporated under reduced pressure and the residue was taken up in a little water. The mixture was made alkaline by means of a 10% aqueous solution of sodium hydroxide and extracted with dichloromethane. The collected organic phases were washed with water and the solvent was evaporated under reduced pressure. The residue was taken up in a n-hexane/isopropanol mixture and allowed to stand for 4hours at a temperature of 5°C. and was then filtered. The filtrate was diluted with ethyl ether, treated with animal charcoal, filtered and acidified with hydrochloric acid dissolved in dry ethyl ether.

By this procedure 2.7 g. of 2-(2-ethyl-3-benzofuranyl)-N,N-(3-aza-pentamethylene)-acetamidine dihydrochloride were obtained, which were purified by crystallization from an isopropanol/methanol mixture followed by recrystallization from methanol. The purified product had a m.p. of 263°–264°C. Yield: (in unrecrystallized compound): 26% of the theoretical yield.

EXAMPLE 3

2-(3-Benzofuranyl)-N,N-(3-methyl-3-aza-pentamethylene)-acetamidine dihydrochloride

*a.* Ethyl-3-benzofuranyl-iminoacetate hydrochloride

In a 250 ml. three-necked flask fitted with a mechanical stirrer, a dip-thermometer, a gas-bubbling tube and an outlet tube were introduced 3.4 g. (0.0216 mol) of 3-cyanomethyl-benzofuran, 4 ml. of anhydrous ethanol and 40 ml. of dry ethyl ether. The solution was cooled to −15°C. and dry gaseous hydrochloric acid was bubbled through for 6 hours while stirring. During this operation the temperature was maintained below −5 °C. Then 40 ml. of dry ether were added and the reaction medium was allowed to stand for 12 hours at room temperature. The precipitate so formed was filtered out and washed with dry ethyl ether.

By this procedure, 3.15 g. of ethyl 3-benzofuranyliminoacetate hydrochloride were obtained, m.p. 138°–141°C., representing a yield of 60% of the theoretical value.

*b.* 2-(3-Benzofuranyl)-N,N-(3-methyl-3-aza-pentamethylene)-acetamidine dihydrochloride While stirring, 3.13 g. (0.0131 mol) of ethyl 3-benzofuranyl-iminoacetate hydrochloride were added to a solution of 1.39 g. of 97% N-methyl-piperazine (0.0135 mol) in 10 ml. of methanol.

The reaction medium was allowed to stand for 48 hours at room temperature, the solvent evaporated under reduced pressure and the residue taken up in a little water. The mixture was made alkaline by means of a 10 % aqueous solution of sodium hydroxide and extracted twice with ether. The collected organic phases were washed with water, dried over anhydrous sodium sulphate, filtered and the solvent evaporated under reduced pressure. The residue was taken up in fresh ethyl ether and the solution acidified with hydrochloric acid dissolved in ethyl ether. The precipitate which formed, was purified by crystallization from a methyl ethyl ketone/isopropanol/ethyl ether mixture and recrystallized from a methyl ethyl ketone/isopropanol mixture.

By this procedure, a first fraction of 0.7 g. of 2-(3-benzofuranyl)-N,N-(3-methyl-3-aza-pentamethylene)-acetamidine dihydrochloride, m.p. 249°–252°C. (decomposition) was obtained, representing a yield of 22% of the theoretical value.

EXAMPLE 4

2-(3-Ethyl-2-benzofuranyl)-N,N-(3-methyl-3-aza-pentamethylene) -acetamidine hydrochloride

*a.* 2-Chloromethyl-3-ethyl-benzofuran

In a 500 ml. three-necked flask fitted with a mechanical stirrer, a dip-thermometer and a dropping funnel, were placed 10 g. (about 0.11 mol) of trioxane and 150 ml. of concentrated hydrochloric acid. To this solution were added dropwise with vigorous stirring 29.2 g. (0.2 mol) of 3-ethyl-benzofuran, care being taken to maintain the temperature at about 25°–30°C.

This operation lasted about 30 minutes after which stirring was maintained for a further 2 hours. The contents of the flask were then poured into a decanter and the organic phase was extracted three times with petroleum ether (b.p. 30°–60°C.). The extracts were collected, washed four times with distilled water and dried over anhydrous sodium sulphate. The mixture was filtered, the solvent evaporated under reduced pressure and the residue submitted to fractional distillation. By this procedure, 24.9 g. of 2-chloromethyl-3-ethyl-benzofuran, b.p. 84°C. (under 0.2 mm.Hg), were obtained, representing a yield of 64% of the theoretical value.

*b.* 2-Cyanomethyl-3-ethyl-benzofuran

Into a 500 ml. flask equipped with a mechanical stirrer and a dropping funnel, were introduced 9.1 g. (0.14 mol) of powdered potassium cyanide, 0.1 g. of potassium iodide and 50 ml. of dimethylformamide. While stirring, 24.5 g. (0.126 mol) of 2-chloromethyl-3-ethyl-benzofuran were added. The operation lasted about 45 minutes after which stirring was maintained at room temperature for 5 hours. 200 ml. of ice-cold water were then added and the organic phase was extracted four times with ethyl ether. The extracts were collected, washed with water and dried over anhydrous sodium sulphate. The mixture was filtered, the solvent evaporated under reduced pressure and the residue submitted to fractional distillation. By this method, 13.3 g. of 2-cyanomethyl-3-ethyl-benzofuran,m.p. 54-55°C. (from n-hexane), were obtained, representing a yield of 57% of the theoretical value.

*c.* Ethyl (3-ethyl-2-benzofuranyl)-iminoacetate hydrochloride

In a 500 ml. three-necked flask fitting with a mechanical stirrer, a dip-thermometer, and a gas-bubbling tube, were place 35 g. (0.189 mol) of 2-cyanomethyl-3-ethyl-benzofuran, 18 ml. of absolute ethanol and 100 ml. of anhydrous ethyl ether. The solution was cooled to −15°C., then while stirring, dry hydrochloric acid was bubbled through for 6 hours. Throughout this operation, the temperature was maintained between −15°C. and −5°C. A further 200 ml. of dry ethyl ether were added and the solution was allowed to stand for 14 hours at room temperature. The reaction medium was cooled to −20°C. The iminoester hydrochloride which precipitated was filtered off, washed with dry ether and dried under vacuum in the presence of potassium hydroxide tablets. By this procedure, 35.6 g. of ethyl (3-ethyl-2-benzofuranyl)-iminoacetate hydrochloride, m.p. 120°C. (decomposition), were obtained, representing a yield of 70% of the theoretical value.

*d.* 2-(3-Ethyl-2-benzofuranyl)-N,N-(3-methyl-3-aza-pentamethylene)-acetamidine hydrochloride By following the procedure as described in the foregoing Example 1, but using ethyl (3-ethyl-2-benzofuranyl)-iminoacetate hydrochloride and 1-methylpiperazine, there was obtained 2-(3-ethyl-2-benzofuranyl)-N,N-(3-methyl-3-aza-pentamethylene)-acetamidine hydrochloride, m.p. 234°–237°C. (decomposition).

By using the same procedure, the following compound of formula I was also prepared:

| Compound | Melting Point (°C.) |
|---|---|
| 2-(3-ethyl-2-benzofuranyl)-N,N-(3-aza-pentamethylene)-acetamidine hydrochloride | 220–224 |

EXAMPLE 5

2-(2-Benzofuranyl)-N,N-(3-n-propyl-3-aza-pentamethylene)-acetamidine a. Ethyl (2-benzofuranyl)-iminoacetate hydrochloride In a 500 ml. three-necked flask fitted with a mechanical stirrer, a dip-thermometer, a gas-bubbling tube and an outlet tube, 31.4 g. (0.2 mol) of 2-cyanomethyl-benzofuran were dissolved in 13 ml. of dry ethanol and 70 ml of anhydrous ethyl ether. The solution was cooled to −15°C., then while stirring, dry hydrochloric acid was bubbled through for about 6 hours. Throughout this operation, the temperature was maintained at between −15° and −5°C., after which the bubbling was stopped and the mixture was diluted with 400 ml. of dry ethyl ether and allowed to stand for 12 hours. The precipitate so formed was filtered out, washed three times with dry ethyl ether and dried under vacuum in a desiccator in the presence of potassium hydroxide tablets.

By this procedure 28.75 g. of ethyl 2-benzofuranyl-iminoacetate hydrochloride were obtained, m.p. 138°C., representing a yield of 60% of the theoretical value.

b. 2-(2-Benzofuranyl)-N,N-(3-n-propyl-3-aza-pentamethylene)acetamidine hydrochloride To a solution of 1.51 g. (0.0118 mol) of 1-n-propyl-piperazine in 7 ml. of methanol, were added 2.8 g. (0.0117 mol) of 2-benzofuranyl-iminoacetate hydrochloride. The mixture was allowed to stand for 7 days at a temperature of 25°C. Dry ethyl ether was added to the reaction medium to precipitate the reaction product. The oily phase was decanted, separated out from the solvent and taken up in fresh ethyl ether. Precipitation of the amidine was provoked by scratching the inner wall of the reaction vessel with a glass rod. The resulting precipitate was filtered out and purified by crystallization from an isopropanol/ethyl ether mixture. After recrystallization from an ethyl acetate/methanol mixture, 1 g. of 2-(2-benzofuranyl)-N,N-(3-n-propyl-3-aza-pentamethylene)-acetamidine hydrochloride, m.p. 213°–216°C., was obtained, representing a yield of 27% of the theoretical value.

EXAMPLE 6

2-(2-Ethyl-2,3-dihydro-3-benzofuranyl)-N,N-(3-n-propyl-3-aza-pentamethylene)-acetamidine hydrochloride a. (2-Ethyl-2,3-dihydro-3-benzofuranyl)-acetic acid A solution of 30.1 g. (0.1475 mol) of (2-ethyl-3-benzofuranyl)-acetic acid in 225 ml. of glacial acetic acid was hydrogenated in a Parr bomb at 70 pounds/sq. inch in the presence of 10 g. of 10% palladium on active charcoal and with gentle heating by means of an infrared lamp. After about 4 hours, the theoretical quantity of hydrogen was absorbed. The solution was filtered and the solvent evaporated under reduced pressure. The residue was taken up in a 10% by weight aqueous solution of potassium carbonate and the resulting solution was extracted once with ethyl ether. The solution containing the potassium salt of the acid was acidified with hydrochloric acid. The resulting (2-ethyl-2,3-dihydro-3-benzofuranyl)-acetic acid was extracted with ethyl ether and washed with water. The ethereal solution was dried over anhydrous sodium sulphate and the solvent was evaporated. The residue so obtained was purified by crystallization from a n-hexane/benzene/petroleum ether (b.p. 30°–60°C.) mixture.

In this way 14.9 g. of (2-ethyl-2,3-dihydro-3-benzofuranyl)-acetic acid, m.p. 130°–133°C., were obtained, representing 49% of the theoretical value.

b. 2-(2-Ethyl-2,3-dihydro-3-benzofuranyl)-acetamide

To a solution of 20.6 g. (0.1 mol) of (2-ethyl-2,3-dihydro-3-benzofuranyl)-acetic acid in 100 ml. of anhydrous benzene, were added 50 ml. of fresh distilled thionyl chloride and a few drops of dimethylformamide. The reaction mixture was refluxed for 4 hours after which the solvent was evaporated to dryness. The crude (2-ethyl-2,3-dihydro-3-benzofuranyl)-acetyl chloride so obtained was taken up in 250 ml. of anhydrous ethyl ether. The solution was cooled in icewater and dry gaseous ammonia was passed through the solution. A copious precipitate of amide and ammonium chloride formed. The solvent was evaporated to dryness under reduced pressure and the residue was taken up in distilled water. The precipitate was filtered out, washed with water and dried.

In this way 16.4 g. of crude (2-ethyl-2,3-dihydro-3-benzofuranyl)-acetamide were obtained (80% of the theoretical value) which were purified by crystallization from benzene, m.p. 134°–136°C.

c. (2-Ethyl-2,3-dihydro-3-benzofuranyl)-acetonitrile

To a solution of 30.75 g. (0.15 mol) of 2-ethyl-2,3-dihydro-3-benzofuranyl)-acetamide in 600 ml. of anhydrous toluene were added 75 g. of phosphorous pentoxide. The reaction medium was refluxed for 16 hours, allowed to cool to 60°C. and the toluene layer decanted. The residue was carefully decomposed by adding water and then extracted three times with ethyl ether. The ethereal extracts were collected, washed with water, dried over anhydrous sodium sulphate and added to the toluene phase. The solvents were evaporated under reduced pressure and the oily residue obtained was purified by distillation and solidified after a few hours.

By this procedure 19.1 g. of (2-ethyl-2,3-dihydro-3-benzofuranyl)-acetonitrile, b.p. 117°–120°C. (under 0.5 mm. Hg), were obtained, representing a yield of 68% of the theoretical value.

d. Ethyl (2-ethyl-2,3-dihydro-3-benzofuranyl)-iminoacetate hydrochloride

A solution, protected from moisture, of 10 g. (0.0535 mol) of (2-ethyl-2,3-dihydro-3-benzofuranyl)-acetonitrile in a mixture of 10 ml. of absolute ethanol and 100 ml. of dry ethyl ether was maintained between −15° and −5°C. while dry hydrochloric acid was bubbled therethrough for 6 hours. The reaction mixture was allowed to stand at 20°C. for 15 hours and the ethyl ether as well as the excess ethanol were evaporated to dryness at room temperature. The crude product so obtained was dried under vacuum in a desiccator over potassium hydroxide tablets and then taken up in 300 ml. of dry ethyl ether. The precipitate which formed after some time was filtered off and washed with dry ethyl ether.

In this way 8.64 g. of ethyl (2-ethyl-2,3-dihydro-3-benzofuranyl)-iminoacetate hydrochloride, m.p. 100°C., were obtained, representing a yield of 60% of the theoretical value.

e. 2-(2-Ethyl-2,3-dihydro-3-benzofuranyl)-N,N-(3-n-propyl-3-aza-pentamethylene)-acetamidine hydrochloride To a solution of 1.35 g. (0.015 mol) of 1-n-propylpiperazine in 20 ml. of methanol were added 2.83 g. (0.015 mol) of ethyl (2-ethyl-2,3-dihydro-3-benzofuranyl)-iminoacetate hydrochloride. The reaction mixture was allowed to stand for 4 days at 20°C. The solvent was evaporated under reduced pressure and the pasty residue was crystallized from an isopropanol/ethyl ether mixture.

In this way 2.1 g. of 2-(2-ethyl-2,3-dihydro-3-benzofuranyl)-N,N-(3-n-propyl-3-aza-pentamethylene)-acetamidine hydrochloride, m.p. 205°–208°C., were obtained, representing a yield of 67% of the theoretical value.

By the procedure hereabove described but using 1-ethyl-piperazine the following compound was obtained:

| Compound | Melting Point (°C.) |
|---|---|
| 2-(2-ethyl-2,3-dihydro-3-benzofuranyl)-N,N-(3-ethyl-3-aza-pentamethylene)-acetamidine hydrochloride | 224–226 |

EXAMPLE 7

2-(2,3-Dihydro-2-benzofuranyl)-N,N-(3-n-propyl-3-aza-pentamethylene)-acetamidine hydrochloride a. (2,3-Dihydro-2-benzofuranyl)-acetamide Dry gaseous ammonia was bubbled at 5°C. through 250 ml. of dry ethyl ether containing (2,3-dihydro-2-benzofuranyl)-acetyl chloride obtained from 31 g. (0.174 mol) of (2,3-dihydro-2-benzofuranyl)-acetic acid.

After saturation, the reaction medium was allowed to stand for one hour and the solvent was evaporated to dryness under reduced pressure. The residue was taken up in water, stirred and then filtered off. The precipitate so obtained was washed with water and dried.

In this way 29.9 g. of crude (2,3-dihydro-2-benzofuranyl)-acetamide were obtained (97% of the theoretical value), which were purified by crystallization from an isopropanol/ethyl ether mixture. m.p. 168°–170°C.

b. (2,3-Dihydro-2-benzofuranyl)-acetonitrile

To a solution of 32.8 g. (0.185 mol) of (2,3-dihydro-2-benzofuranyl)-acetamide in 1000 ml. of dry toluene were added 75 g. of phosphorous pentoxide. The reaction mixture was refluxed for 20 hours, then allowed to cool to about 60°C.

The aqueous phase was decanted, the residue carefully decomposed with water and the mixture was extracted three times with ethyl ether. The ethereal extracts were washed with water and dried over anhydrous sodium sulphate. The toluene phase was collected with the ethereal phase, the mixture of solvents evaporated under vacuum and the residue obtained was purified by distillation.

In this way 22.9 g. of (2,3-dihydro-2-benzofuranyl)acetonitrile, b.p. 105°–106°C. (under 0.5 mm.Hg) were obtained, representing 78% of the theoretical value.

c. Ethyl (2,3-dihydro-2-benzofuranyl)-iminoacetate hydrochloride

Dry hydrochloric acid gas was bubbled for 6 hours through a solution of 11.03 g. (0.075 mol) of 2,3-dihydro-2-benzofuranyl)-acetonitrile in a mixture of 100 ml. of dry ethyl ether and 10 ml. of absolute ethanol which was maintained between −15° and −5°C. and protected from moisture. A further 250 ml. of dry ethyl ether was added and the reaction medium was allowed to stand for 3 days at 0°C. The precipitate obtained was filtered out, washed with dry ethyl ether and dried under vacuum in a desiccator over potassium hydroxide tablets.

By this procedure, 10.7 g. of ethyl (2,3-dihydro-2-benzofuranyl)-iminoacetate hydrochloride, m.p. 113°–115°C., were obtained, representing a yield of 59% of the theoretical value.

d. 2-(2,3-dihydro-2-benzofuranyl)-N,N-(3-n-propyl-3-aza-pentamethylene)-acetamidine hydrochloride To a solution of 2.35 g. (0.0183 mol) of 1-n-propyl-piperazine in 20 ml. of methanol were added 4.4 g. (0.0182 mol) of ethyl (2,3-dihydro-2-benzofuranyl)-iminoacetate hydrochloride. The reaction mixture was allowed to stand for 48 hours at 20°C. By adding ethyl ether the reaction product was precipitated in an oily form. The precipitate was taken up in a few millilitres of isopropanol and then ethyl ether was added until turbidity first appeared. The mixture was allowed to stand at room temperature and some days later, the precipitate which formed was filtered off.

By this procedure, 0.4 g. of 2-(2,3-dihydro-2-benzofuranyl)-N,N-(3-n-propyl-3-aza-pentamethylene)-acetamidine hydrochloride, m.p. 207°–209°C., was obtained, representing a yield of 6.8%.

EXAMPLE 8

Tablets were prepared by compressing ungranulated powders of the following ingredients in accordance with known pharmaceutical techniques:-

| Ingredient | mg. per tablet |
|---|---|
| 2-(2-ethyl-3-benzofuranyl)-N,N-(3-ethyl-3-aza-pentamethylene)-acetamidine dihydrochloride | 50 |
| Milk sugar | 75 |
| Starch | 57 |
| Polyvinylpyrrolidone | 5 |
| Alginic acid | 6 |
| Talc | 5 |
| Colloidal silica | 0.5 |
| Magnesium stearate | 1.5 |
| | 200 mg. |

EXAMPLE 9

Tablets were prepared by compressing ungranulated powders of the following ingredients in accordance with known pharmaceutical techniques:-

| Ingredient | mg. per tablet |
|---|---|
| 2-(2-ethyl-3-benzofuranyl)-N,N-(3-n-propyl-3-aza-pentamethylene)-acetamidine dihydrochloride | 100 |

| Ingredient | mg. per tablet |
|---|---|
| Milk sugar | 100 |
| Starch | 76 |
| Polyvinylpyrrolidone | 6 |
| Alginic acid | 8 |
| Talc | 6 |
| Colloidal silica | 1 |
| Magnesium stearate | 3 |
| | 300 mg. |

The tablets prepared in accordance with Example 8 or 9 may be varnished and plasticized by means of cellulose acetophthalate and diethylphthalate respectively.

We claim:

1. A compound of the formula:

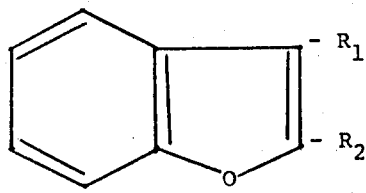

wherein $R_1$ and $R_2$, which are different, represent hydrogen, straight- or branched-chain lower alkyl having from 1 to 4 carbon atoms, or a radical of the formula:

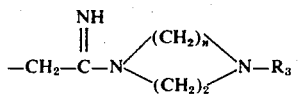

wherein $n$ is one of the integers 2 and 3, and $R_3$ represents, when $n$ is 3, hydrogen or straight- or branched-chain lower alkyl having from 1 to 4 carbon atoms, or when $n$ is 2, hydrogen, straight- or branched-chain lower alkyl having from 1 to 4 carbon atoms, lower hydroxyalkyl having 1-4 carbon atoms, carbethoxy, phenyl, chlorophenyl, fluorophenyl, trifluoromethylphenyl, benzyl, or pyridyl, or pharmaceutically acceptable acid addition salts thereof.

2. 2-(2-Ethyl-3-benzofuranyl)-N,N-(3-ethyl-3-aza-pentamethylene)-acetamidine or its pharmaceutically acceptable acid addition salts.

3. 2-(2-Ethyl-3-benzofuranyl)-N,N-(3-n-propyl-3-aza-pentamethylene)-acetamidine or its pharmaceutically acceptable acid addition salts.

4. 2-(2-Ethyl-3-benzofuranyl)-N,N-(3-methyl-3-aza-pentamethylene)-acetamidine or its pharmaceutically acceptable acid addition salts.

5. 2-(2-Ethyl-3-benzofuranyl)-N,N-(3-carbethoxy-3-aza-pentamethylene)-acetamidine or its pharmaceutically acceptable acid addition salts.

6. 2-(2-Ethyl-3-benzofuranyl)-N,N-(3-isopropyl-3-aza-pentamethylene)-acetamidine or its pharmaceutically acceptable acid addition salts.

7. 2-(2-Ethyl-3-benzofuranyl)-N,N-[3-(2-hydroxy-1-propyl)-3-aza-pentamethylene]-acetamidine or its pharmaceutically acceptable acid addition salts.

8. 2-(2-Ethyl-3-benzofuranyl)-N,N-(3-aza-pentamethylene)-acetamidine or its pharmaceutically acceptable acid addition salts.

* * * * *